United States Patent Office 2,739,904
Patented Mar. 27, 1956

2,739,904

PREPARATION OF NEUTRAL INORGANIC OXIDE PIGMENTS

Walter Frey, Basel, Switzerland, assignor to Saeurefabrik Schweizerhall, Schweizerhalle, Switzerland No Drawing. Application March 14, 1951,
Serial No. 215,639

Claims priority, application Switzerland April 3, 1950

14 Claims. (Cl. 106—300)

This invention relates to a process for the preparation of neutral inorganic oxide pigments from acidic finely divided inorganic oxides containing an adhering acid. In particular it relates to a process for producing neutral titanium oxide pigments.

In the decomposition of volatile metal chlorides, and particularly in the decomposition of titanium chloride with oxygen-containing gases at high temperatures, it is important to obtain the oxides, for example, titanium oxide, in a very finely divided form. The decomposition not only yields the oxides but also involves formation of free chlorine and small quantities of hydrogen chloride which is formed from the moisture contained in the gases used in the decomposition, such as, for example, oxygen. For this reason the mineral oxides obtained are always strongly acid, chlorine and hydrochloric acid being absorbed or adsorbed on the surface of the fine particles. Although the free chlorine can be almost completely removed by aeration or evacuation of the product, the hydrogen chloride remains very firmly adhering to the large surface area of the many small particles. The quantity of the firmly adherent hydrogen chloride amounts to about 0.1–0.3% of the weight of the oxide, and the product has a corresponding pH value of about pH 2–4.

Heretofore, the oxides have been converted into neutral pigments by a subsequent calcination at temperatures of 600° C. and over. By this known process it is possible to obtain a completely neutral pigment, yet other pigment properties are unfavorably influenced thereby, particularly the particle size. During the calcination an increase in particle size takes place to some extent, and to some extent there is an aggregation of the particles so that the product becomes coarser and harder and cannot be used without first being ground. Pigment particles which require grinding in order to attain the very fine particle sizes needed for pigment uses are inferior to products which can be used in the original finely divided precipitated form.

It has now been found that a completely neutral and finely divided pigment can be obtained without need for any calcination or grinding operation if the acidic oxides are mixed in a dry state with an alkaline reacting oxy-compound of an alkaline earth metal in a quantity at least sufficient for neutralization and are then moistened with a carefully limited amount of water and dried. Magnesium is here included as an alkaline earth metal.

Calcium oxide or hydroxide and barium oxide or hydroxide are particularly suitable for the neutralization, but the corresponding compounds of strontium and magnesium also are quite effective.

It has been found that by simply mixing the acidic oxides with the alkaline reacting oxy-compounds of the alkaline earth metals there is still an incomplete neutralization of the oxides and that acidic particles of oxide remain in appreciable quantities together with the strongly alkaline particles, as, for example, calcium hydroxide particles, so that the product is thus an objectionably heterogeneous mixture. This phenomenon is easily understandable when it is considered that the neutralization typically requires only a very small quantity (of the order of 0.1%) of the alkaline earth compound; for example, only about 1 particle of lime is present for about 1000 particles of the pigment oxide when the materials have a similar particle size.

It obviously is possible to achieve complete neutralization by making the product into a paste or slurry with water, but the production of dry neutral pigments by such thorough wetting necessitates a further series of operations, such as filtration, drying and grinding. Even then, the resulting inorganic metal oxide pigments do not have the same pigmentary properties as the originally formed pigments.

It has now been surprisingly found that alkaline reacting oxy-compound of the alkaline earth metals, such as lime, can be caused to attract completely the hydrogen chloride of the pigment oxides and thus to neutralize their acidity homogeneously, by merely moistening the mixture of dry materials with a very small quantity of water. The amount of water to be added for this purpose depends on the acidity of the oxide and also on the speed with which it is desired to neutralize the adhering acid, but it is always so small that the particles attain no more than a moist condition in which they do not form lumps or a paste. This condition is obtained, in general, when the amount of added water is not more than 10% of the weight of the pigment oxide. In most cases amounts of water between 1% and 3% (calculated on the weight of the pigment oxide), and often even smaller amounts down to as little as 0.25%, are insufficient to produce a completely homogeneous neutralized pigment in a short time (in a few minutes to one hour).

The addition of water in excess of the specified amount (e. g. over 10%) is definitely disadvantageous, as in that case lumps are formed which do not disintegrate after the drying but harden and make grinding necessary. The moistening of the pigment before mixing with the alkaline earth compound is also disadvantageous, as again lumps are formed which make the neutralization of the individual particles difficult.

The best mixture of the oxide products with the alkaline earth compounds is obtained by mixing the finely divided materials mechanically at elevated temperatures of the order of about 100° C. In this way one can avoid the danger of lump formation which otherwise may be caused to some extent by the reaction water formed by neutralization during the mixing. The moistening of the formed mixture can be carried out by adding the water in a finely dispersed state, as in the form of steam or a liquid spray. It is advantageous to have the mixture in a warmed state and subject it to continuous agitation or tumbling while the water is being added.

After the neutralization is completed the pigment is dried, and without further treatment a soft, fine and powdery product is obtained.

As indicated above, the hydrogen chloride content of the acidic oxides is not constant, but is subject to considerable variations. In order to obtain a quite neutral product the addition of alkaline earth must therefore be exactly calculated with relation to the acid content, but in a continuous process this would involve serious difficulties.

It has now been found that these difficulties, too, can be avoided, so as to make possible an efficient continuous neutralization process, by adding an excess of the alkaline earth compound so that the pigment oxide is overneutralized to start with, and then neutralizing the excess alkalinity by the addition of gaseous carbonic acid after moistening the mixture but before drying it. For this purpose an excess of not less than 5% nor more than 200% of the alkaline earth compound may be added, based on the theoretical amount needed for neutralisation, and for best results the excess amount added is between 10 and 30%. The neutralization of the excess alkaline earth takes place in a few minutes provided that the product is still moist.

By means of the process of the present invention it is possible for the first time to prepare a homogeneous neutral pigment from the fine oxides obtained by decomposition of volatile metal chlorides, without need for a calcination process harmful to the product or for a grinding operation.

The mixing of the alkaline reacting alkaline earth metal compound with the acidic oxide, the moistening of the mixture, the drying and, if desired, the treatment with carbonic acid, can all be carried out efficiently in a single mixing drum. The manner of practicing the process on a large scale will naturally be adapted to the prevailing conditions.

The following examples further illustrate the invention:

*Example I*

Titanium tetrachloride is decomposed with an excess of oxygen in a flame of carbon monoxide and oxygen, and the oxide formed is separated by an electrostatic filter at a temperature of about 200° C. From the electrostatic filter the finely divided oxide, which is still quite warm, is passed into a rotatable mixing drum fitted with a heating and cooling jacket, in which a vacuum is applied to free the material from chlorine gas still contained in the voids. The resulting product, which contains about 0.1% of hydrogen chloride, is then treated with 0.15% of finely sieved slaked lime and thoroughly mixed with it for 30 minutes. Its temperature at the start of mixing is still of the order of about 100° C., and during the mixing the contents of the drum are cooled to about 80° C. Then the mixture is adjusted to a moisture content of 1% by blowing in steam or by spraying with liquid water while the mixing drum is turning. The drum is allowed to rotate for another 30 minutes and is then evacuated and filled with carbonic acid gas. After about 30 minutes the excess of carbonic acid is removed by suction and the drum is subjected to a vacuum or heated to 100° C. in order to obtain the pigment in a completely dry state. The dried titanium oxide is quite neutral and has excellent pigment qualities, being a soft fine powder free of objectionable particle agglomerates.

*Example II*

Five kilograms of finely divided zirconium dioxide, prepared by decomposing preheated zirconium tetrachloride vapor with preheated oxygen at 1000° C., was spread on a plate in a layer 1 inch thick and aerated for 3 hours. An analysis then made of the product showed that it contained 0.18% of HCl. Twenty four grams of finely powdered barium hydroxide containing 90% of Ba(OH)$_2$ were then sprinkled over the layer and thoroughly mixed throughout the oxide by hand. Then 15 grams of water were sprayed over the material, and the mixing was continued during the spraying and afterward for about 30 minutes. After another 60 minutes the product was dried in a drying chamber at 100° C., and a homogeneous neutral ZrO$_2$ was obtained in a fine powdery state.

The process of these examples can also be applied advantageously to finely divided oxides of Si, Zr, Cr, Fe, Al, and the like, which contain adherent hydrogen chloride, such as pigment oxides of these minerals which have been prepared from their chlorides.

The practice of this invention has been exemplified herein by various details and examples but it will be understood that these details may be varied widely and that substitutions, additions or omissions can be made without departing from the spirit or the scope of the application which is intended to be defined by the appended claims.

What is claimed is:

1. A process for preparing a neutralized pigment from an acidic finely divided titanium oxide produced by the high temperature decomposition of titanium tetrachloride with oxygen containing gas which comprises thoroughly mixing a dry mass of the titanium oxide with finely divided slaked lime in a quantity at least sufficient to neutralize its acidity, moistening and mixing the mixture evenly with a limited quantity of water insufficient to convert it into lumps or a paste, and thereafter drying the moist material to obtain thereby a homogeneous finely divided pigment free of acidity.

2. A process for preparing a neutralized inorganic oxide pigment from an acidic finely divided oxide of the group consisting of finely divided oxides of silicon, titanium, zirconium, chromium, iron and aluminum produced by the high temperature decomposition of a volatile inorganic chloride with an oxygen-containing gas, which comprises thoroughly mixing a dry mass of the oxide with a finely divided alkaline-reacting alkaline earth metal oxy-compound in a quantity at least sufficient to neutralize its acidity, moistening and mixing the mixture evenly with a limited quantity of water insufficient to convert it into lumps or paste, and thereafter drying the moist material to obtain thereby a homogeneous finely divided pigment free of acidity.

3. A process for preparing a neutralized inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises thoroughly mixing a dry mass of the oxide with a finely divided alkaline-reacting alkaline earth metal oxy-compound in a quantity at least sufficient to neutralize the hydrogen chloride, moistening and mixing the formed mixture evenly with a limited quantity of water insufficient to convert it into lumps or paste, and thereafter drying the moist material to obtain thereby a homogeneous dry finely divided pigment free of acidity.

4. A process for preparing a neutralized inorganic oxide pigment from an acidic finely divided oxide product of the group consisting of finely divided oxides of silicon, titanium, zirconium, chromium, iron and aluminum and being produced by the high temperature decomposition of a volatilized inorganic chloride with oxygen-containing gas, which comprises removing residual chlorine from said product, thereafter thoroughly mixing a dry mass of said product with a finely divided alkaline-reacting alkaline earth metal oxy-compound in a quantity at least sufficient to neutralize its acidity, mixing the resulting mixture evenly with a limited quantity of water sufficient only to moisten it without forming lumps or paste, and thereafter drying the moist material to obtain thereby a homogeneous finely divided neutral pigment.

5. A process for preparing a neutral inorganic oxide pigment from an acidic finely divided oxide of the group consisting of finely divided oxides of silicon, titanium, zirconium, chromium, iron and aluminum produced by the high temperature decomposition of a volatile inorganic chloride with an oxygen-containing gas, which comprises thoroughly mixing the oxide in a dry state with a finely divided alkaline-reacting alkaline earth metal oxy-compound in a quantity substantially exceeding that required to neutralize its acidity, mixing the resulting mixture evenly with a limited quantity of water sufficient only to moisten it without forming lumps or paste, thereby neutralizing said acidity, then neutralizing the excess alkalinity with gaseous carbonic acid, and thereafter drying the moist material to obtain thereby a finely divided neutral pigment.

6. A process for preparing a neutralized inorganic oxide pigment from an acidic finely divided oxide of the group consisting of finely divided oxides of silicon, titanium, zirconium, chromium, iron and aluminum produced by the high temperature decomposition of a volatile inorganic chloride with an oxygen-containing gas, which comprises thoroughly mixing said oxide in a dry state and at an elevated temperature of the order of 100° C. with a finely divided alkaline-reacting alkaline earth metal oxy-compound in a quantity at least sufficient to neutralize its acidity, mixing the resulting mixture evenly with a limited quantity of water sufficient only to moisten it without forming lumps or paste, and thereafter drying the moist material to obtain thereby a homogeneous finely divided neutral pigment.

7. A process for preparing a neutral inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises thoroughly mixing said oxide in a dry state with a finely divided alkaline-reacting alkaline earth metal oxy-compound in a quantity sufficient to neutralize the hydrogen chloride, mixing the resulting mixture evenly at an elevated temperature with from 0.25% to 10% of water, based on the weight of said oxide, and thereafter drying the moist material to obtain thereby a homogeneous finely divided neutral pigment.

8. A process for preparing a neutral inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises thoroughly mixing said oxide in a dry state with a finely divided alkaline-reacting alkaline earth metal oxy-compound in a quantity sufficient to neutralize the hydrogen chloride, mixing the resulting mixture evenly with steam in a quantity sufficient only to moisten it, and thereafter drying the moist material to obtain thereby a homogeneous finely divided neutral pigment.

9. A process for preparing a neutral inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises thoroughly mixing said oxide in a dry state with a finely divided alkaline-reacting alkaline earth metal oxy-compound in a quantity sufficient to neutralize the hydrogen chloride, mixing the resulting mixture evenly with a fine spray of water until it is moist but still in a finely divided state, and thereafter drying the moist material to obtain thereby a homogeneous finely divided neutral pigment.

10. A process for preparing a neutral inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises mixing said oxide in a dry state with finely divided slaked lime in a quantity sufficient to neutralize the hydrogen chloride, mixing the resulting mixture evenly with a limited quantity of water sufficient only to moisten it without forming lumps or paste, and thereafter drying the moist material to obtain thereby a homogeneous finely divided neutral pigment.

11. A process for preparing a neutral inorganic oxide pigment from a finely divided oxide of the group consisting of finely divided oxides of silicon, titanium, zirconium, chromium, iron and aluminum produced by the high temperature decomposition of a volatile inorganic chloride with oxygen-containing gas and containing adherent hydrogen chloride, which comprises mixing said oxide in a dry state with powdered barium hydroxide in a quantity sufficient to neutralize the hydrogen chloride, mixing the resulting mixture evenly with a limited quantity of water sufficient only to moisten it without forming lumps or paste, and thereafter drying the moist material to obtain thereby a homogeneous finely divided neutral pigment.

12. A process for preparing a neutral inorganic pigment from an acidic finely divided inorganic oxide of the group consisting of finely divided oxides of silicon, titanium, zirconium, chromium, iron and aluminum produced by the high temperature decomposition of a volatile inorganic chloride with an oxygen-containing gas which comprises, during continuous tumbling of a dry mass of the oxide mixing said oxide with a finely divided alkaline-reacting alkaline earth oxy-compound in a quantity just sufficient to neutralize its acidity until a homogeneous mixture is obtained, adding finely divided water in a quantity equaling 0.25% to 10% of the weight of said oxide to form a homogeneous moist mixture of solids, and thereafter drying the moist material to obtain thereby a homogeneous finely divided pigment free of acidity.

13. A process for preparing a neutral inorganic pigment from an acidic finely divided inorganic oxide of the group consisting of finely divided oxides of silicon, titanium, zirconium, chromium, iron and aluminum produced by the high temperature decomposition of a volatile inorganic chloride with an oxygen-containing gas which comprises, tumbling said oxide with finely divided slaked lime in an amount of the order of magnitude of 0.1% of the weight of said oxide until a homogeneous mixture is obtained, continuing the tumbling action while adding finely divided water in a quantity equaling 0.25% to 10% of the weight of said oxide to form a homogeneous moist mixture of solids, and thereafter continuing the tumbling action while drying the moist material to obtain thereby a homogeneous finely divided pigment free of acidity.

14. A process for preparing a neutral inorganic pigment from an acidic finely divided inorganic oxide of the group consisting of finely divided oxides of silicon, titanium, zirconium, chromium, iron and aluminum produced by the high temperature decomposition of a volatile inorganic chloride with an oxygen-containing gas which comprises, tumbling said oxide with a finely divided alkaline-reacting alkaline earth oxy-compound in a quantity exceeding by from 5 to 200% the theoretical amount for complete neutralization of the acidity of the mass until a homogeneous mixture is obtained, tumbling the mixture while adding finely divided water in a quantity equaling 0.25% to 10% of the weight of said oxide to form a homogeneous moist mixture of solids, continuing the tumbling and neutralizing the excess alkalinity by adding gaseous carbonic acid, and thereafter tumbling and drying the moist material to obtain thereby a finely divided neutral pigment.

References Cited in the file of this patent

UNITED STATES PATENTS

| | | |
|---|---|---|
| 2,333,948 | Muskat | Nov. 9, 1943 |
| 2,340,610 | Muskat et al. | Feb. 1, 1944 |
| 2,347,496 | Muskat et al. | Apr. 25, 1944 |
| 2,367,118 | Heiner | Jan. 9, 1945 |
| 2,437,171 | Pechukas | Mar. 2, 1948 |
| 2,559,638 | Krchma et al. | July 10, 1951 |